C. F. HEINSS.
MOTOR PLOW.
APPLICATION FILED MAR. 16, 1914.
1,170,635.
Patented Feb. 8, 1916.
2 SHEETS—SHEET 1.
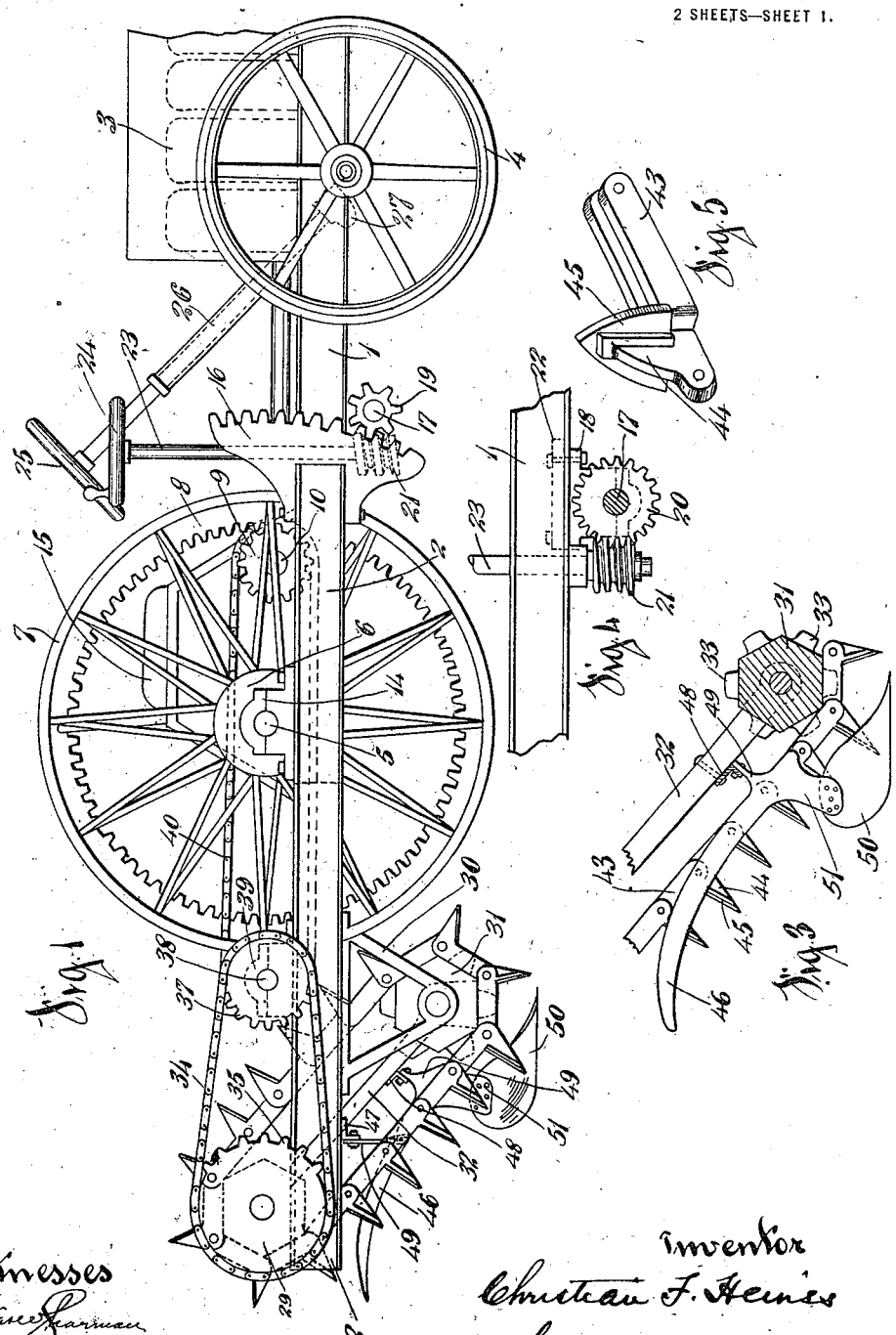

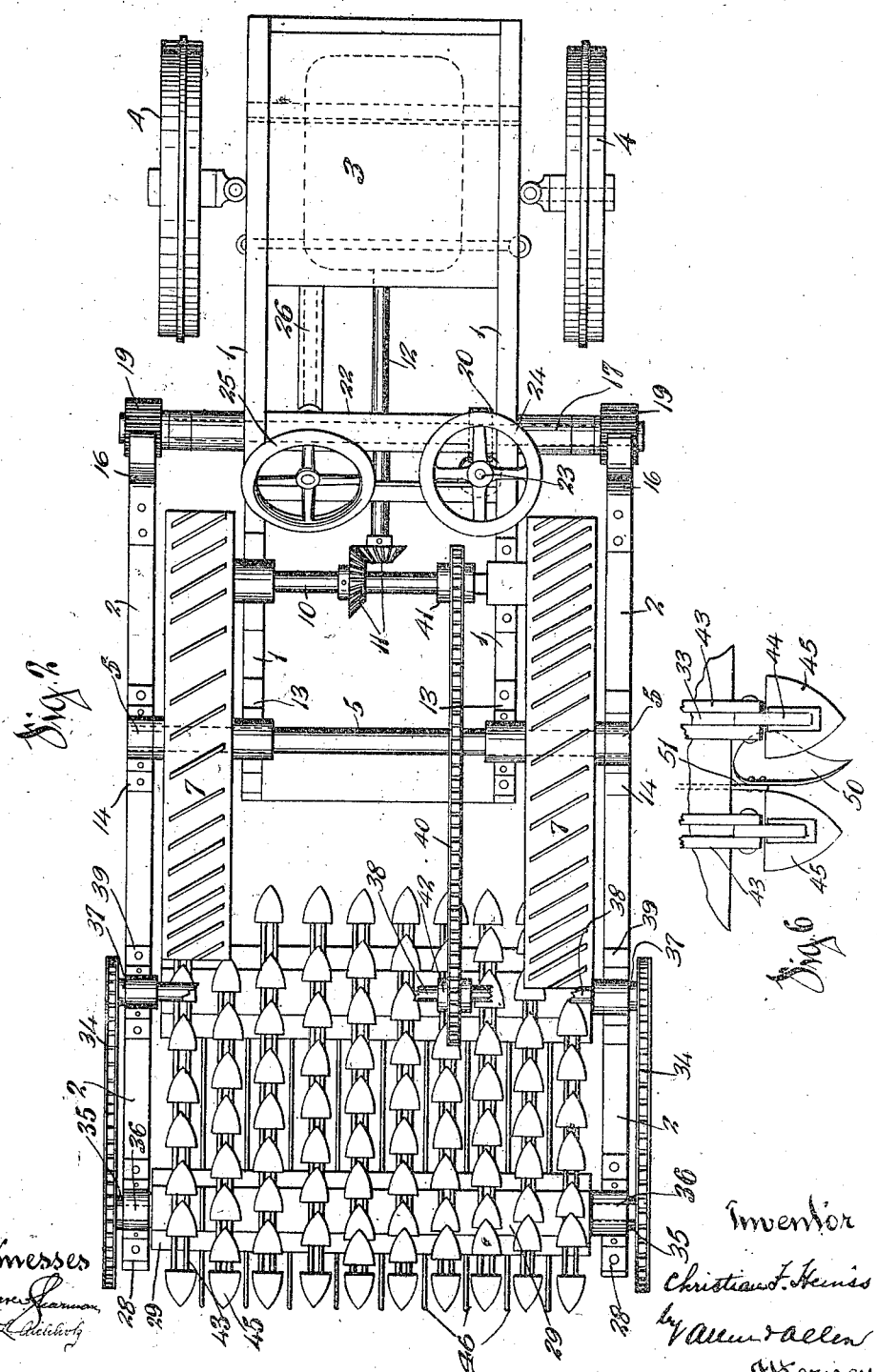

UNITED STATES PATENT OFFICE.

CHRISTIAN F. HEINSS, OF HUNTINGTON, INDIANA.

MOTOR-PLOW.

1,170,635.  Specification of Letters Patent.  Patented Feb. 8, 1916.

Application filed March 16, 1914.  Serial No. 824,845.

*To all whom it may concern:*

Be it known that I, CHRISTIAN F. HEINSS, a citizen of the United States, and a resident of Huntington, in the county of Huntington and State of Indiana, have invented certain new and useful Improvements in Motor-Plows, of which the following is a full, clear, and exact description, reference being had to the accompanying drawings, forming part of this specification.

My invention relates to the class of plows where digging tools are mounted in an endless chain or upon the periphery of a drum so as to be successively brought into contact with the soil to be cultivated and where the diggers travel considerably faster than the plow, somewhat after the fashion of a stern paddle steamboat.

It has as its object the providing of a strong and economical means for mounting and operating the spades or diggers, and simplicity of structure so that operation is easy and that home repairing may be done readily.

The details of structure and special advantages derived therefrom, together with claims for the novelty residing therein will be hereinafter developed.

In the drawings, Figure 1 is a side elevation of the motor plow. Fig. 2 is a top plan view of the same. Fig. 3 is a detail of one of the chains and strike-off bars with the lower drum in section. Fig. 4 is a detail of the worm and shaft for raising and lowering the plow frame. Fig. 5 is a perspective view on a larger scale of one of the links and spades. Fig. 6 is a detail showing the arrangement of spades and plows at the base of the machine.

*The frame and driving means.*—The cultivator comprises two frames 1 and 2, the former carrying the motor 3 and supported on an axle carrying the fore wheels 4, 4, and the latter carrying the drums and chains which do the plowing or cultivating.

The machine has a central axle 5 on which are journaled the hubs 6 of the driving wheels 7. These driving wheels have roughened rims to prevent slipping, and are internally toothed at 8. A pinion 9 on a shaft 10 meshes with this internal gear so formed and the shaft is driven by means of the beveled gears 11 and the driving shaft 12 of the motor 3, as is obvious. Journal boxes 13 for the frame 1, and 14 for the frame 2 are mounted on the main axle 5. The frame 1 has thus a support on two axles, while the frame 2 is supported on but one. The frame 1 has the motor 3 superimposed upon it, and it has also upon it the driver's seat 15. The frames are preferably made of stout channel bars, as illustrated.

The cultivator portions are mounted upon the back end of the machine on the end of the frame 2. These portions must be lifted from contact with the ground to allow traveling of the machine from place to place, and it is also desirable to throw the portions deeply into the ground or only shallowly, according to the depth of cultivation desired. To attain best results, this lifting and lowering should be under control of the driver within reach of his seat, and it should be easy to operate. It is therefore provided that the end of the frame 2, extending forwardly from its journal 14 on the main axle 5, is raised and lowered, thus rocking the cultivator parts in the opposite direction. A large segmental rack plate 16 is mounted on the ends of the channel bars of the frame 2 at each side. A shaft 17 is mounted on journals 18 bolted at the under side of the cross bar 22 of the frame 1 (Fig. 4). Pinions 19, 19 are mounted on the ends of this shaft to mesh with the racks 16, 16. A worm gear 20 is mounted on this shaft so as to mesh with a worm 21, mounted on a vertical rod 23 journaled on the frame 1. A hand wheel 24 on this rod within convenient reach from the driver's seat is employed by the driver to turn the worm, and hence the pinions 19 which force up or down the rack plates. Thus a great expenditure of strength is not required to alter the position of the cultivator parts with relation to the balance of the machine. The driver has the control within easy reach and the adjustment for digging may be quickly and accurately made.

A steering wheel 25, with steering rod 26 and knuckle 27, of usual form is provided for steering the machine. Neither a clutch nor a differential is shown, because these parts are not absolutely necessary and would unduly complicate the drawings.

*The cultivator parts.*—At the back end and on top of the frame 2 are journal boxes 28, 28, for the upper chain drum 29, and on hangers 30 beneath said frame and farther front are journals for the lower chain drum 31 (Fig. 1.) Braces 32, running diagonally from the end of the frame to the hangers, give additional strength. The two drums are identical in shape, being hexagonal in cross section, and provided with a number of circumferential series of teeth 33, one series for each chain of spades as will be developed. The upper drum 29 is the only one that is driven, the lower one being an idler and turned by the spade chains. The upper drum is driven by means of sprocket chains 34, passing over sprocket wheels 35, 35, mounted on the shaft 36 of the drum, the sprocket chains being driven by the gears 37, 37, on a shaft 38 journaled at 39 on the frame. A sprocket chain 40 driven by the sprocket 41 on the shaft 10 (which drives the wheels 7) drives this shaft 38, in turn, working over the sprocket 42 thereon.

The spade chains are separate from each other and any desired number such as ten of them may be used. A series of teeth on each drum for each chain is required. The chains are made up of links 43, pinned or otherwise pivoted to each other. At the closed end of each link is a vertical hook 44, and to this hook is riveted a spade 45. These sprocket chains are driven by the upper drum passing over the lower drum and at the bottom of the movement of each link its spade digs into the earth. If no clearing means were provided, the chains would soon become so clogged up with dirt between them as to interfere with the work of the spades. Grass, sods, weeds and such like would be carried around and around and accumulate rapidly. I therefore provide strike-off bars 46; said bars mounted so as to lie between each chain and its adjacent ones, and flaring downwardly at their rear ends. As the spades pass the point of contact with the soil, their return movement brings each spade alongside of a strike-off bar traveling at first parallel with it and then gradually down from it. Thus the interchain space is cleaned and clods or sods adhering to the spades which are of any size are removed. The mounting of these strike-off bars comprises the upper angle bar 47 extending across and secured to the channel bars and the lower angle bar 48 secured across between the braces 32, spoken of in connection with the hangers for the lower chain drum. The strike-off bars are secured to these cross bars by riveting their arms 49 thereto, at the proper points so that they lie in the interchain space.

To turn over the soil that is dug by the spades, I locate on the lower end of each strike-off bar a small plow or mold board 50. These are rivȩted on an arm 51, which is in turn riveted to the strike-off bar. These plows also assist in the removal of dirt from the spades and chains.

The machine will be so geared that the spade chains run faster than the driving wheels, thereby giving the necessary purchase to the blades so that they will dig deep or shallow as desired. The method of mounting the parts of the machine on a central and common axle, and raising and lowering the entire cultivator frame from this position on the axle as a pivot, gives the desired adjustability for depth to the lower chain drum, without sacrificing strength and durability in any particular. Again the cleaning or striking off of clinging sods, weeds or clods enables the farmer to use this cultivator on new land, or in plowing under heavy growths.

The spade chains being separate may be replaced without obtaining an entire new set, or shipping away all the digging parts, as is the case in such rotary diggers of the prior art.

Purely mechanical features for transmission of power, connection of parts and the like, are not desired to be included as requisite portions of the invention, nor to be construed as limitations to the claims which follow.

Having thus described my invention, what I claim as new and desire to secure by Letters Patent, is:—

1. In a motor cultivator, a pair of drums, a series of pairs of chains upon said drums, spading means located on said chains, means for revolving the drums and means for swinging the chains and their spading means into and out of contact with the soil and plow plates located in the interchain spaces.

2. In a motor cultivator, a pair of drums, a series of pairs of chains upon said drums, spading means located on said chains, a frame, means for rigidly journaling said drums upon said frame, and means for swinging the frame to bring the chains and their spading means into and out of contact with the soil and plow plates located in the interchain spaces of each pair of chains.

3. In a motor cultivator, a pair of drums, a plurality of circumferential series of teeth on said drums, a series of pairs of chains upon said drums and engaged by said teeth, a spading means located on said chains, means for revolving the drums, and means for swinging the chains and their spading means into and out of contact with the soil and plow plates located in the interchain spaces of each pair of chains.

4. In a motor cultivator, a pair of drums, a plurality of circumferential series of teeth on said drums, a series of pairs of chains upon said drums and engaged by said teeth, spading means located on said chains, a frame, means for rigidly journaling said drums upon said frame, and means for swinging the frame to bring the chains and their spading means into and out of contact with the soil and plow plates located in the interchain spaces of each pair of chains.

5. In a motor cultivator, a pair of drums, a series of chains upon said drums, spading means located on said chains, a frame upon which the drums are mounted and means located in the inter-chain spaces of the series to strike off sods or clods from said inter-chain spaces.

6. In a motor cultivator, a series of chains, spading means located on said chains, means for rotating the chains in partial contact with the soil, and means located in the inter-chain spaces of the series to strike off sods or clods from said inter-chain spaces.

7. In a motor cultivator, a series of chains, spading means located on said chains, means for rotating the chains in partial contact with the soil, and means located in the inter-chain spaces of the series and extending outwardly at one end beyond said chains to strike off sods or clods from said inter-chain spaces.

8. In a motor cultivator, a series of chains, spading means located on said chains, means for rotating the chains in partial contact with the soil, and means located in the inter-chain spaces of the series to strike off sods or clods from said inter-chain spaces, and means located at the lowest point of the chains to turn over the soil as it passes from the spading means.

9. In a motor cultivator having driving wheels, a pair of angle corner drums, means for mounting one of said drums above and to the rear of the lower drum, means for positively rotating the drums faster than the driving wheels, chains for the drums having pivoted links, said links of a size to correspond with the faces of the angle cornered drums, and spades perpendicularly mounted on the links and located substantially at the pivotal point of the links, whereby a positive digging motion is given to the spades.

10. In a motor cultivator having driving wheels, a pair of drums having sprocket teeth thereon, means for rotating the drums faster than the driving wheels, chains for the drums having pivoted links, said links of a size to correspond with the flat faces of the drums, and having inclosed apertures for the teeth, and spades perpendicularly mounted on the links and located substantially at the pivotal point of the links, whereby a positive digging motion is given to the spades.

11. In a motor cultivator having driving wheels, a pair of angle corner drums, means for mounting one of said drums above and to the rear of the lower drum, means for rotating the drums faster than the driving wheels, chains for the drums having pivoted links, said links of a size to correspond with the faces of the angle cornered drums, and spades perpendicularly mounted on the links and located substantially at the pivotal point of the links, whereby a positive digging motion is given to the spades.

12. In a motor cultivator having driving wheels, a pair of angle corner drums, means for mounting one of said drums above and to the rear of the lower drum, means for rotating the drums faster than the driving wheels, chains for the drums having pivoted links, said links of a size to correspond with the faces of the angle cornered drums, and spades perpendicularly mounted on the links and located substantially at the pivotal point of the links, whereby a positive digging motion is given to the spades, said lower drum mounted so as to extend underneath the edges of the wheels to cut the ground immediately after the wheels have passed over it.

CHRISTIAN F. HEINSS.

Attest:
CHAS. A. BUTLER,
WINTER S. BLUT.